(12) United States Patent
Adams

(10) Patent No.: US 6,947,545 B2
(45) Date of Patent: Sep. 20, 2005

(54) NUMBER KEYPAD CORRAL

(76) Inventor: John Elias Adams, 662 Laguna Ave., El Cajon, CA (US) 92020

( * ) Notice: Subject to any disclaimer, the term of this patent is extended or adjusted under 35 U.S.C. 154(b) by 370 days.

(21) Appl. No.: 10/208,224

(22) Filed: Jul. 30, 2002

(65) Prior Publication Data
US 2004/0022386 A1 Feb. 5, 2004

(51) Int. Cl.[7] .................................................. H04M 1/00
(52) U.S. Cl. ...................... 379/368; 379/52; 379/433.07
(58) Field of Search ........................... 379/368, 433.06, 379/433.07, 52; 200/5 R

(56) References Cited

U.S. PATENT DOCUMENTS 3,123,676 A * 3/1964 Prescott et al. ............. 379/368
5,311,175 A * 5/1994 Waldman .................... 379/368
5,802,171 A * 9/1998 Deutsch ....................... 379/368

* cited by examiner

Primary Examiner—Jack Chiang

(57) ABSTRACT

A raised corral fence which surrounds a telephone number keypad using its sides with undercut openings and its corners to guide the fingers of the visually impaired to the desired number key.

20 Claims, 2 Drawing Sheets

NUMBER KEYPAD CORRAL

BACKGROUND OF THE INVENTION

As a society ages, new and different health challenges appear. An ever increasing number of people are facing declining eye sight, yet they are not totally and completely blind. While these people function in a society of seeing people, their ability to use the telephone accurately is paramount, if not life sustaining.

The dial keypad buttons of the telephone are usually raised above the surface of the case or body, and very often the #5 key has a tell tale bump, but these helps alone are not sufficient. An older person having difficulty seeing has to rely simultaneously on sense of touch, spacial perception, and memory, just in order to dial. This is a problem when they become confused and loose their place, especially under the pressure of a new number, or the duress of an emergency, or the time limitation imposed by the telephone automatic switching system. In some growing metropolitan areas 10 or 11 numbers are required to make a call, adding to the difficulty for the older persons.

It is therefore, an object of the present invention to provide a new keypad corral and an improved method of selecting the numbers for "dialing" that can solve the above shortcomings and more.

BRIEF SUMMARY OF THE INVENTION

The present invention is directed to the "dial" number keypad of a telephone. A raised corral fence surrounds the number keypad to present a distinctive tell tale system to guide the fingers of the visually impaired person to the desired keys.

The corral is about one fourth of an inch high and has lowered or undercut openings about one eight of an inch recessed to mark the middle of the corral edges. These openings are of different widths to reveal exact location. The narrowest is at the 12 o'clock position, outside of the #2 key. The largest is at the 6 o'clock position. Medium width undercut openings are at both the 9 o'clock and the 3 o'clock positions, outside from the #4 and #6 keys respectively.

Understanding these undercut openings in conjunction with the corral corners always reveals one's exact position on the key pad, so that one is never more than one key space away from a known place of reference.

To these ends, two variations of the corral are described, one incorporating enclosure of the #0 key, called the preferred embodiment. The star key, for example is at the left lower inside corner on the outside of the corral. An alternate embodiment encloses only the first nine number keys, with the star, zero, and pound keys below the corral with the large undercut between the #8 and the #0 keys. The star key, for example is below the corral between the lower left corner and the large undercut opening.

A keypad corral of the instant invention fulfills all of the above objectives. Although the corral has been described in conjunction with the telephone, it may be used with any keypad switch. These and other objects, features, aspects, and advantages of the present invention will become better understood with reference to the following description and accompanying drawings.

DETAILED DESCRIPTION OF THE PRESENT INVENTION

Figure 1:
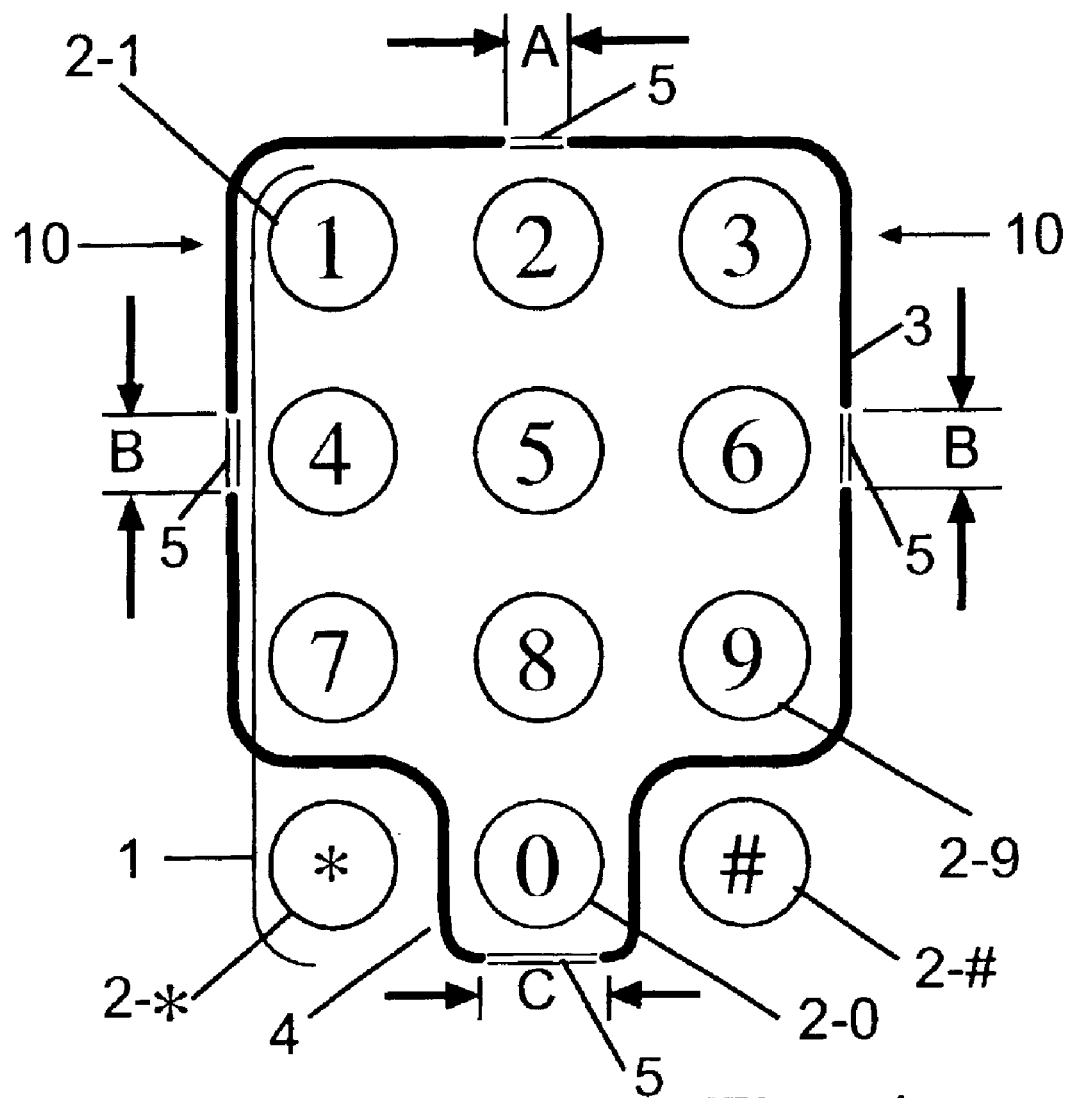
FIG. 1 is a plan view of a number keypad with the corral of the present invention.

Referring to the drawings, FIG. 1 shows a number keypad 1 with number keys 2-1 thru 2-0, having a boundary fence or corral 3 surrounding the first nine number keys in a square layout, with an additional smaller corral 4 around the 2-0 key.

Figure 2:
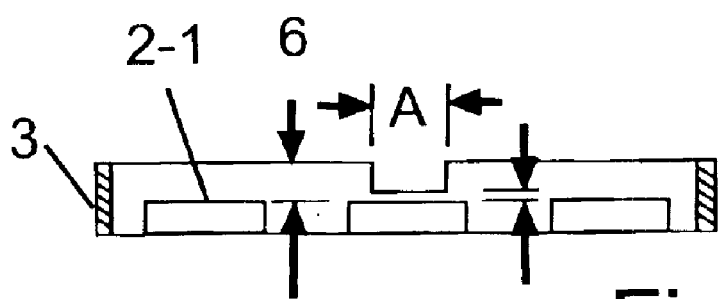
FIG. 2 is an elevational sectional view of the corral taken on line 10—10 of FIG. 1.

The elevational section, FIG. 2 shows another novel feature of the corral 3 of this present invention, which is the under cut opening 5. This is one of the pattern of under cut openings 5 in corrals 3 and 4 to help define ones exact position on the keypad by touch or feel. The height of the corral 3 above the number keys is shown at 6. The height of the openings 5 above the number keys is shown at 7. The width of the opening 5 at the 12 o'clock position above key 2-2 is shown at A.

Now turning back to FIG. 1 the corral 3 has openings 5 of width B at both the 9 o'clock and the 3 o'clock positions. The width of the opening 5 at the 6 o'clock position below key 2-0 is shown at C. These under cut openings 5 in corrals 3 and 4 in addition to the corral's unique shape with straight lines and corners define ones exact position on the keypad by touch or feel so that one is never more than one key from a reference. The key 2-5 is always the next key toward the center from the A or B under cut openings.

Figure 3:
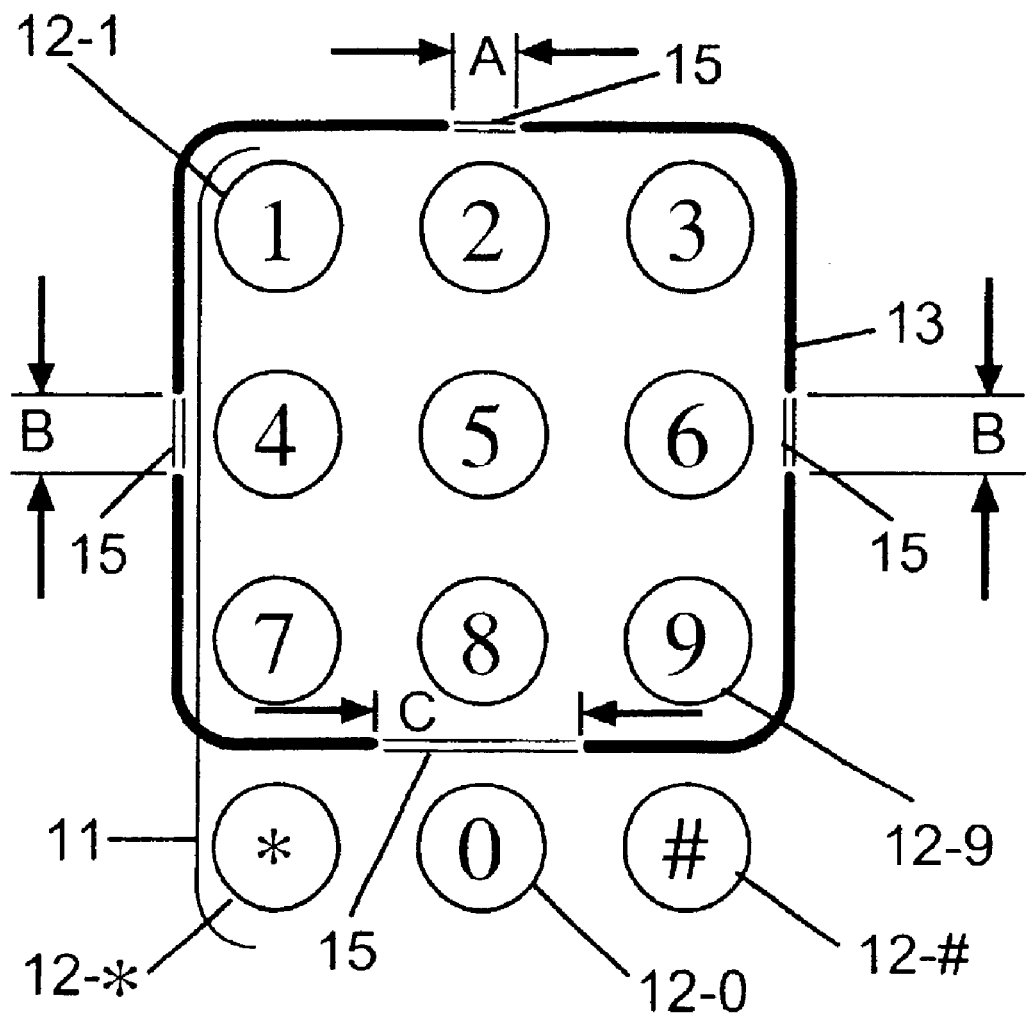
FIG. 3 is a plan view of an alternate number keypad corral.

FIG. 3 is an alternate plan view of a number keypad 11 with number keys 12-1 thru 12-0. Boundary fence or corral 13 in a square shape, surrounds keys 12-1 thru 12-9. Under cut openings 15 in corral 13 are arranged similar to A, B, and C in FIG. 1. The Key 12-0 is below opening C. Key 12-# is between C and the right corner. The corral, openings, and corners define ones exact position on the keypad by touch or feel.

Figure 4:
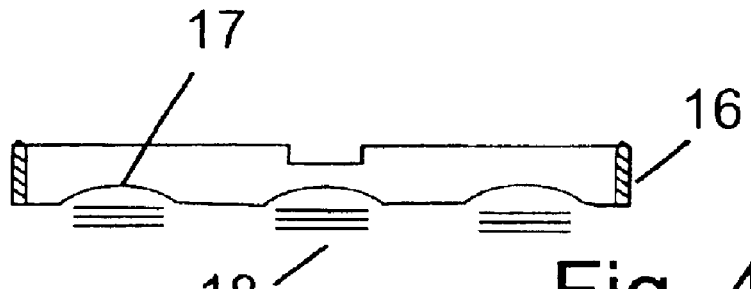
FIG. 4 is a sectional view of an alternate membrane switch with a corral.

FIG. 4 is an elevational sectional view of an alternate membrane switch with a system of boundary fences or corral 16 surrounding typical number buttons 17 with switch mechanism 18.

The system of undercut openings allows one to approach the telephone keypad from any direction, side or top or bottom, discern their position and properly orient themselves to dial accurately.

The need for the keypad corral to the visually impaired has been pointed out, however the same system benefits those people with good vision, because the corral serves as a constant tell tale reference as to their finger's exact location on the keypad, thus helping prevent miss dialed numbers.

Although a preferred embodiment has been shown and described, it will be apparent to those skilled in the art that many changes and modifications may be made without departing from the spirit and scope of the present invention.

What is claimed is:

1. A device attachable to a conventional telephone having a keypad with push-buttons arranged in the traditional matrix of numbers and signs consisting of 1, 2, 3, 4, 5, 6, 7, 8, 9, *, 0, and #, for providing tactile guidance to the location of the keypad push-buttons to assist in accurate entry of phone numbers and signs in proper sequence without being able to see the key-pad, the device comprising:

an elevated ridge extending around the periphery of at least the area of said key-pad wherein the numbers 1 through 9 are located;

tactually perceivable reductions in the elevation of said ridge adjacent at least the numbers 2, 4, 6 and 8; and said reduction in elevation adjacent number 2 being of a width that is of a tactually perceivable different width than the width of the reduction in elevation adjacent number 8.

2. The device of claim 7 in which the reductions in elevation adjacent numbers 4 and 6 are equal in width, and are each different that the reductions in elevation adjacent the number 2 and 8.

3. The device in claim 1 in which width of the reduction in elevation adjacent number 8 is significantly larger than the width of any of the other said reductions in elevations.

4. The device in claim 1 in which said elevated ridge extends approximately ¼ inch above the keypad.

5. The device of claim 1 in which said elevated ridge extends approximately ¼ inch above the keypad buttons.

6. A device attachable to a conventional telephone having a keypad with push-buttons arranged in the traditional matrix of numbers and signs consisting of 1, 2, 3, 4, 5, 6, 7, 8, 9, *, 0, and #, for providing tactile guidance to the location of the keypad push-buttons to assist in accurate entry of phone numbers and signs in proper sequence without being able to see the key-pad, the device comprising:

an elevated ridge extending around the periphery of the area of said key-pad wherein the numbers 1 through 9 and 0 are located;

tactually perceivable reductions in the elevation of said ridge adjacent at least the numbers 2, 4, 6 and 0; and said reduction in elevation adjacent number 2 being of a width that is of a tactually perceivable different width than the width of the reduction in elevation adjacent number 0.

7. The device of claim 6 in which the reductions in elevation adjacent numbers 4 and 6 are equal in width, and are each different than the reductions in elevation adjacent the number 2 and 0.

8. The device in claim 6 in which the width of the reduction in elevation adjacent number 0 is significantly larger than the width of any of the other said reductions in elevations.

9. The device in claim 6 in which said elevated ridge extends approximately ¼ inch above the keypad.

10. The device of claim 6 in which said elevated ridge extends approximately ¼ inch above the keypad buttons.

11. In a conventional telephone having a keypad with push-buttons arranged in the traditional matrix of numbers and signs consisting of 1, 2, 3, 4, 5, 6, 7, 8, 9, *, 0, and #, an improvement for providing tactile guidance to the location of the keypad push-buttons to assist in accurate entry of phone numbers and signs in proper sequence without being able to see the key-pad comprising:

an elevated ridge extending around the periphery of the area of said key-pad wherein the numbers 1 through 9 and 0 are located;

tactually perceivable reductions in the elevation of said ridge adjacent at least the numbers 2, 4, 6 and 0; and said reduction in elevation adjacent number 2 being of a width that is of a tactually perceivable different width than the width of the reduction in elevation adjacent number 0.

12. The improvement of claim 11 in which the reductions in elevation adjacent numbers 4 and 6 are equal in width, and are each different than the reductions in elevation adjacent the number 2 and 0.

13. The improvement of claim 11 in which the width of the reduction in elevation adjacent number 0 is significantly larger than the width of any of the other said reductions in elevation.

14. The improvement of claim 11 in which said elevated ridge extends approximately ¼ inch above the keypad.

15. The improvement of claim 11 in which said elevated ridge extends approximately ¼ inch above the keypad buttons.

16. In a conventional telephone having a keypad with push-buttons arranged in the traditional matrix of numbers and signs consisting of 1, 2, 3, 4, 5, 6, 7, 8, 9, *, 0, and #, an improvement for providing tactile guidance to the location of the keypad push-buttons to assist in accurate entry of phone numbers and signs in proper sequence without being able to see the key-pad comprising:

an elevated ridge extending around the periphery of the area of said key-pad wherein the numbers 1 through 9 are located;

tactually perceivable reductions in the elevation of said ridge adjacent at least the numbers 2, 4, 6 and 8; and said reduction in elevation adjacent number 2 being of a width that is of a tactually perceivable different width than the width of the reduction in elevation adjacent number 8.

17. The improvement of claim 16 in which the reductions in elevation adjacent numbers 4 and 6 are equal in width, and are each different than the reductions in elevation adjacent the number 2 and 8.

18. The improvement of claim 16 in which width of the reduction in elevation adjacent number 0 is significantly larger than the width of any of the other said reductions in elevations.

19. The improvement of claim 16 in which said elevated ridge extends approximately ¼ inch above the keypad.

20. The improvement of claim 16 in which said elevated ridge extends approximately ¼ inch above the keypad buttons

* * * * *